(12) United States Patent
Tsumekawa et al.

(10) Patent No.: US 8,767,274 B2
(45) Date of Patent: Jul. 1, 2014

(54) IMAGE SENSOR UNIT, IMAGE READER, AND IMAGE FORMING APPARATUS

(75) Inventors: Yoshihiko Tsumekawa, Saitama (JP); Kenji Nagata, Saitama (JP)

(73) Assignee: Canon Components, Inc. (JP)

( * ) Notice: Subject to any disclaimer, the term of this patent is extended or adjusted under 35 U.S.C. 154(b) by 0 days.

(21) Appl. No.: 13/527,667

(22) Filed: Jun. 20, 2012

(65) Prior Publication Data

US 2012/0320436 A1     Dec. 20, 2012

(30) Foreign Application Priority Data

Jun. 20, 2011    (JP) ................................ 2011-136434
Mar. 30, 2012    (JP) ................................ 2012-081749

(51) Int. Cl.
     *H04N 1/04*            (2006.01)

(52) U.S. Cl.
     USPC ........................... 358/475; 358/474; 358/509

(58) Field of Classification Search
     USPC ......... 358/474, 475, 509, 497, 498, 496, 482, 358/483
     See application file for complete search history.

(56) References Cited

U.S. PATENT DOCUMENTS

| | | | | |
|---|---|---|---|---|
| 5,489,992 A | * | 2/1996 | Endo .............................. | 358/482 |
| 5,696,607 A | * | 12/1997 | Yamana et al. ............... | 358/474 |
| 6,172,356 B1 | | 1/2001 | Ogura et al. | |
| 6,322,497 B1 | * | 11/2001 | Takahashi ..................... | 600/118 |
| 6,357,903 B1 | * | 3/2002 | Furusawa et al. ............. | 362/555 |
| 6,388,774 B1 | * | 5/2002 | Kurata et al. ................. | 358/474 |
| 6,417,508 B1 | | 7/2002 | Ogura et al. | |
| 6,635,011 B1 | * | 10/2003 | Ozawa et al. ................. | 600/178 |
| 7,209,268 B2 | * | 4/2007 | Ikeda ............................ | 358/475 |
| 7,419,274 B2 | | 9/2008 | Sawada | |
| 7,684,637 B2 | | 3/2010 | Ishikawa et al. | |
| 7,738,146 B2 | * | 6/2010 | Osakabe et al. .............. | 358/497 |
| 7,969,622 B2 | * | 6/2011 | Saika ............................ | 358/475 |

(Continued)

FOREIGN PATENT DOCUMENTS

| | | |
|---|---|---|
| JP | 10-93765 A | 4/1998 |
| JP | 11-331494 A | 11/1999 |

(Continued)

OTHER PUBLICATIONS

Office Action issued in corresponding Japanese Patent Application No. 2012-081749 issued Jul. 9, 2013. English Summary provided.

(Continued)

*Primary Examiner* — Negussie Worku
(74) *Attorney, Agent, or Firm* — Rossi, Kimms & McDowell LLP

(57) ABSTRACT

An image sensor unit includes: a light source including a light-emitting surface that emits light; a substantially rod-shaped light guide including a light emitter that linearizes the light from the light source and irradiates a sheet; an image sensor that receives light from the sheet and converts the light into an electric signal; a light condenser focusing the light from the sheet onto the image sensor; a circuit board on which the light source and the image sensor are mounted; and a frame accommodating the light guide, the light condenser and the circuit board. The light condenser and the light emitter of the light guide are disposed substantially parallel to each other. The center line of the light-emitting surface of the light source is disposed nearer the optical axis of the light condenser than the center line of the light emitter.

7 Claims, 15 Drawing Sheets

(56) References Cited

U.S. PATENT DOCUMENTS

| | | | |
|---|---|---|---|
| 7,978,380 B2* | 7/2011 | Ohama et al. | 358/494 |
| 7,982,924 B2* | 7/2011 | Endo et al. | 358/474 |
| 7,990,584 B2* | 8/2011 | Ikeda | 358/484 |
| 7,995,252 B2* | 8/2011 | Okamoto et al. | 358/487 |
| 8,059,315 B2* | 11/2011 | Endo et al. | 358/474 |
| 8,379,275 B2* | 2/2013 | Tahk et al. | 358/475 |
| 8,482,824 B2* | 7/2013 | Nagasaka | 358/509 |
| 8,488,216 B2* | 7/2013 | Sakamoto et al. | 358/475 |
| 8,537,434 B2* | 9/2013 | Takahashi et al. | 358/475 |
| 2005/0151990 A1 | 7/2005 | Ishikawa et al. | |
| 2006/0050390 A1 | 3/2006 | Sawada | |
| 2012/0188616 A1 | 7/2012 | Takeda et al. | |

FOREIGN PATENT DOCUMENTS

| | | |
|---|---|---|
| JP | 2000-101781 A | 4/2000 |
| JP | 2004-193773 A | 7/2004 |
| JP | 2006-333430 A | 12/2006 |
| JP | 2009-094722 A | 4/2009 |
| JP | 2012-151792 A | 8/2012 |
| WO | 2004/054232 A1 | 6/2004 |

OTHER PUBLICATIONS

JP OA issued Apr. 30, 2013 for corres. JP2012-081749.

* cited by examiner

Y DIRECTION →

Y DIRECTION →

IMAGE SENSOR UNIT, IMAGE READER, AND IMAGE FORMING APPARATUS

CROSS-REFERENCE TO RELATED APPLICATIONS

This application is based upon and claims the benefit of priority of the prior Japanese Patent Application No. 2011-136434, filed on Jun. 20, 2011, and the Japanese Patent Application No. 2012-081749, filed on Mar. 30, 2012, the entire contents of which are incorporated herein by reference.

BACKGROUND OF THE INVENTION

1. Field of the Invention

The present invention relates to an image sensor unit, an image reader and an image forming apparatus. More specifically, the present invention relates to an image sensor unit used for a scanner, a copier, a multifunction printer and the like, an image reader and an image forming apparatus that employ this image sensor unit.

2. Description of the Related Art

A light guide type illuminating device has been known as an illuminating device used for an image sensor unit.

For instance, Patent Document 1 discloses a conventional technique, which is a contact image sensor unit accommodating, in a frame or the like, a sensor board on which photoelectric converting sensor chips are mounted, an LED light source, a light guide that guides light from the LED light source in the main scanning direction to emit the light in a desired direction.

Unfortunately, the configuration of the unit described in Patent Document 1 requires a dedicated light source in conformity with the position and shape of the light guide, in order to provide the light source on an end face in the longitudinal direction. This causes a problem of increasing the cost.

Thus, image sensor units, for instance, as disclosed in Patent Documents 2 to 4 are disclosed. More specifically, the contact image sensor unit described in Patent Document 2 includes a light guide that is substantially rod-shaped and has end portions bent at right angles toward a sensor board, and an LED irradiates a light-incident surface of the light guide (a light-incident surface opposite to the sensor board) with light. A reflective surface is formed at a flexion of the light guide. Light incident on the incident surface is reflected by the reflective surface, thereby being guided into a portion at which a diffusing surface and an emission surface are formed. Accordingly, the light entering into the light guide is diffused by the diffusing surface and emitted from the emission surface to an external sheet. Light reflected by the sheet travels in parallel to the direction in which the LED emits light, and reaches a sensor unit. The contact image sensor unit described in Patent Document 3 includes a substantially rod-shaped a light guide formed such that a main region and an auxiliary region are connected to each other in series along the longitudinal direction, and a light source irradiating the auxiliary region of the light guide with light. The auxiliary region is for allowing the light from the light source to travel into the main region, and includes a downward facing light-incident surface that receives the light from the light source, and a reflective surface that reflects the incident light toward the main region. Furthermore, a reflector, which covers portions other than the incident surface, is provided in the auxiliary region, thereby preventing the light from leaking from the portions other than the incident surface. This configuration enables illumination efficiency at a reading line of a sheet to be improved. Patent Document 4 discloses an example of an arrangement of an LED light source on a sensor board, and a positional relationship of a light-incident surface of a light guide opposed to a light emitting surface of the LED light source.

Patent Document 1: Japanese Laid-open Patent Publication No. 11-331494
Patent Document 2: Japanese Laid-open Patent Publication No. 10-93765
Patent Document 3: International Publication Pamphlet No. WO2004/054232
Patent Document 4: Japanese Laid-open Patent Publication No. 2004-193773

On scanners, copiers and multifunction printers there are increasing demands for reduction in size, weight and cost. Accordingly, also on an image sensor unit incorporated therein, there are further demands for reduction in size, weight and cost. For the sake of reduction in size, weight and cost of the image sensor unit, it is typically required to use an inexpensive surface-mounted light source while reducing the size and weight of a light source and a circuit board on which image sensor unit is mounted. Unfortunately, according to the configuration described in Patent Document 2 or 3, the light source, such as LED, is required to be arranged immediately below an incident surface of the light guide. This causes a problem in that it is difficult to reduce the size and weight of the circuit board and, in turn, difficult to reduce the size and weight of the image sensor unit.

SUMMARY OF THE INVENTION

The present invention is made in view of such situations. It is an object of the present invention to provide image sensor unit that can reduce the size, weight and cost, and an image reader and an image forming apparatus that employ this image sensor unit.

In order to solve the problem, the present invention is an image sensor unit reading an illuminated object, including: a light source including a light-emitting surface that emits light; a light guide including a substantially rod-shaped light emitter elongated in a main scanning direction in which the light from the light source is emitted to the illuminated object; an image sensor that receives light from the illuminated object and converts the light into an electric signal; a light condenser that focuses the light from the illuminated object onto the image sensor; a circuit board elongated in the main scanning direction on which the light source and the image sensor are mounted; and a frame accommodating the light guide, the light condenser and the circuit board, wherein, in plan view of a surface of the circuit board on which the light source and the image sensor are mounted in a direction of a normal, a center of the light-emitting surface of the light source is closer to the image sensor than a center line of the light emitter of the light guide is.

DETAILED DESCRIPTION OF THE PREFERRED EMBODIMENTS

Embodiments to which the present invention is applicable will be described in detail with reference to drawings. The embodiments of the present invention are an image sensor unit, and an image reader and an image forming apparatus that employ this unit. In the following description, the directions of three dimensions are indicated by respective arrows X, Y and Z. The X direction is a main scanning direction. The Y direction is a sub-scanning direction perpendicular to the main scanning direction. The Z direction is an upward direction. The image sensor unit according to the embodiment of the present invention is capable of reading an image of a sheet P while relatively moving in the sub-scanning direction with respect to the sheet P, which is an illuminated object. That is, the Y direction is the relative moving direction between the image sensor unit according to the embodiment of the present invention and the sheet P.

Embodiment 1

Figure 1:
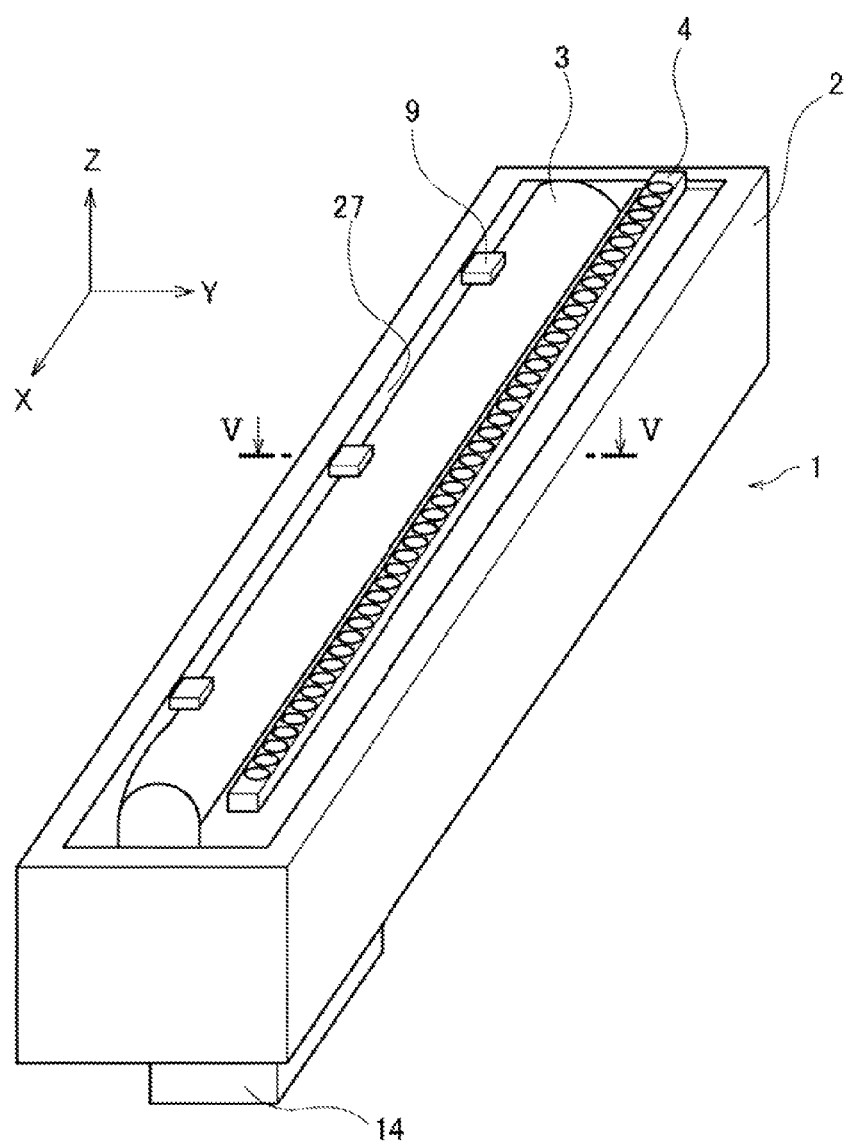
FIG. 1 is an external perspective view schematically showing a configuration of an image sensor unit according to Embodiment 1.
Figure 2:
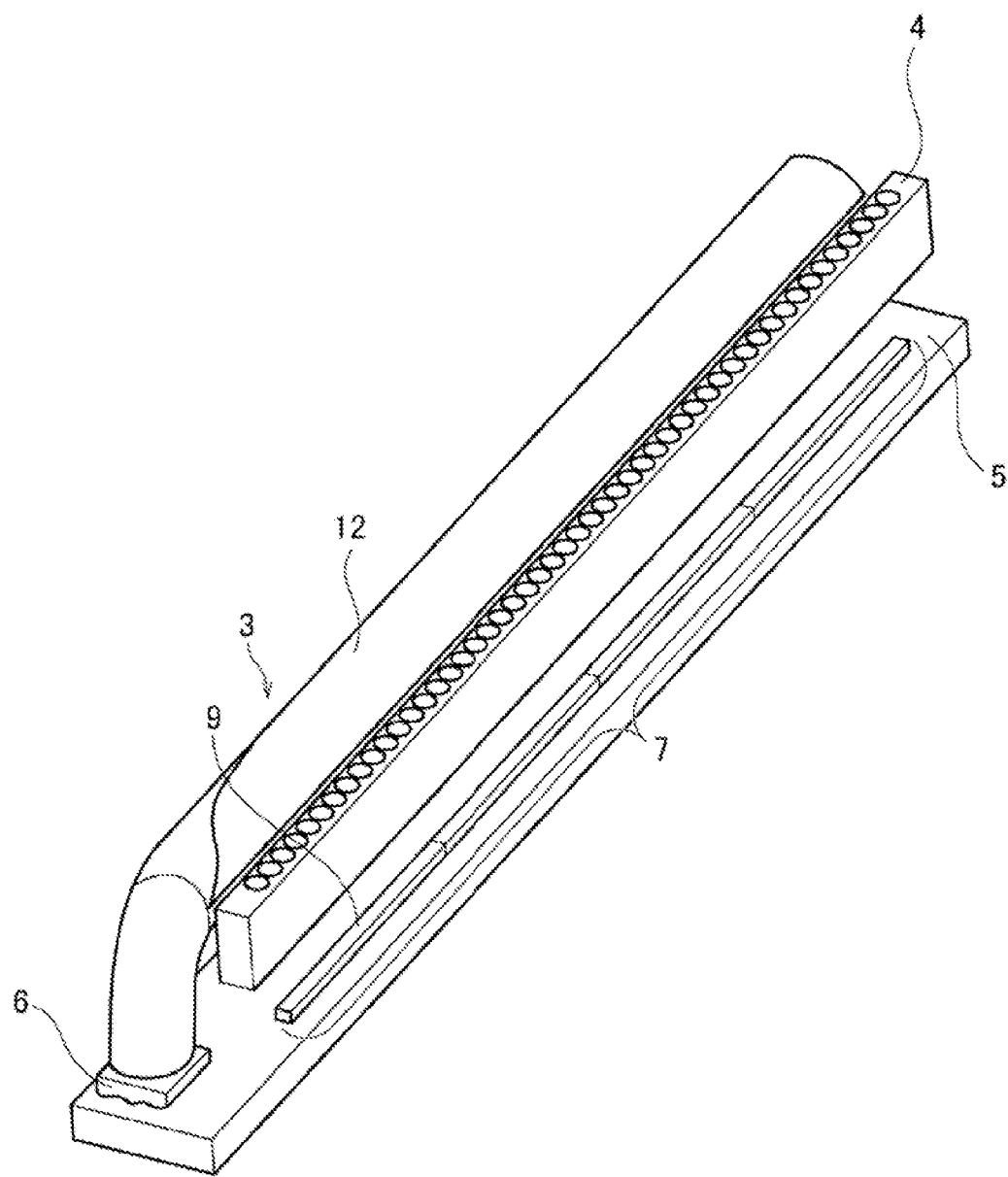
FIG. 2 is a perspective view schematically showing a device arrangement in the image sensor unit according to Embodiment 1.

An image sensor unit 1 according to Embodiment 1 of the present invention will now be described with reference to FIGS. 1 and 2. FIG. 1 is an external perspective view schematically showing the configuration of the image sensor unit 1 according to Embodiment 1. FIG. 2 is a perspective view schematically showing arrangement states of a light condenser, a circuit board, a light source and an image sensor in the image sensor unit 1 according to Embodiment 1. The overview of the configuration of the image sensor unit 1 according to Embodiment 1 is as follows. As shown in FIG. 1, the image sensor unit 1 according to Embodiment 1 is, for instance, a contact image sensor (CIS) unit, and has a configuration of a substantially rectangular parallelepiped elongated in the main scanning direction. As shown in FIGS. 1 and 2, the image sensor unit 1 according to Embodiment 1 includes a frame 2, a light guide 3, the light condenser 4, the circuit board 5, the light source 6 and the image sensor 7. The light source 6 includes, for instance, light-emitting elements $6r$, $6g$ and $6b$ having emitting light wavelengths of three colors, or red R, green G and blue B, respectively. The light source 6 and light guide 3 configure an illuminating device. The light source 6 and the image sensor 7 are mounted on the upper surface of the circuit board 5.

When an image of a sheet P is read by this configuration, the light source 6 sequentially drives the light-emitting elements $6r$, $6g$ and $6b$ to emit light. The light from the light source 6 is linearized by the light guide 3 and emitted toward a reading line S on the sheet P. The light reflected by the sheet P forms an image on the surface of the image sensor 7 by the light condenser 4. The image sensor 7 converts the received light into an electric signal.

The frame 2 is a cabinet of the image sensor unit according to Embodiment 1, and accommodates the light guide 3, the light condenser 4 and the circuit board 5. As shown in FIG. 1, the frame 2 is a substantially rectangular parallelepiped elongated in the main scanning direction. In the frame 2, there are formed a light guide holder 27, which is a space capable of accommodating the light guide 3 and open at the top, a light condenser holder 28 capable of accommodating the light condenser 4, and a circuit board holder 29 capable of accommodating the circuit board 5 (see FIG. 5). Furthermore, in the frame 2, there are formed light guide holding tabs 9 for fixing the light guide 3 accommodated in the light guide holder 27. The light guide holding tab 9 has an elastic deformable structure protruding to the inside of the light guide holder 27, and formed integrally with the frame 2. For instance, the frame is integrally formed of lightproof resin material colored black. The resin material may be, for instance, polycarbonate.

The light condenser 4 is an optical element that forms an image on the image sensor 7 with the light reflected by the sheet P. The light condenser 4 may be a rod lens array having a configuration that linearly arranges erecting equal-magnification imaging elements (rod lenses) in the main scanning direction. The light condenser 4 may have an arrangement along a plurality of lines only provided that the configuration arranges the imaging elements linearly. The configuration is not specifically limited. Conventionally known optical elements having various light condensing functions, such as various micro lens arrays, may be adopted as the light condenser 4.

Figure 3A:
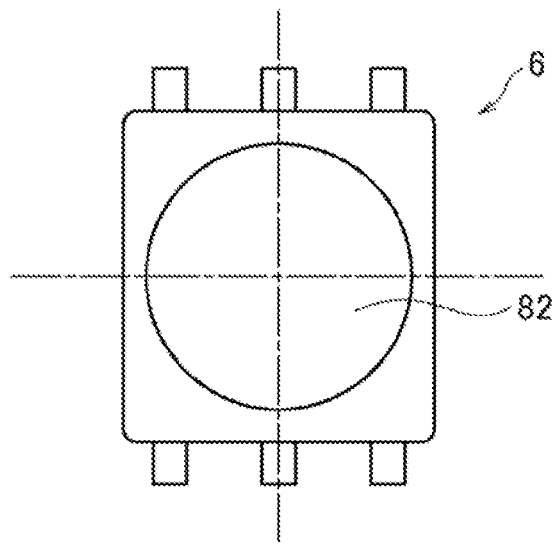
FIG. 3A is a plan view schematically showing a configuration of a light source.
Figure 3B:
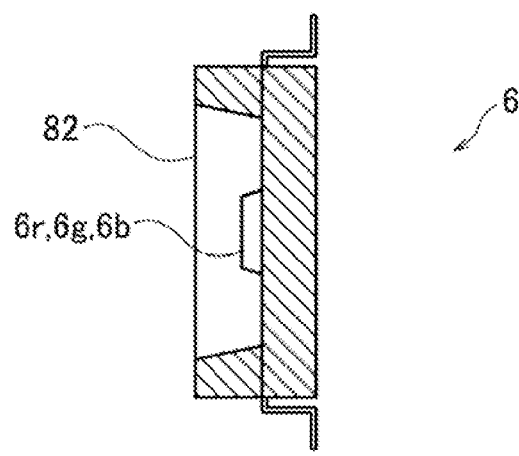
FIG. 3B is a side view of the light source in a sub-scanning direction.
Figure 3C:
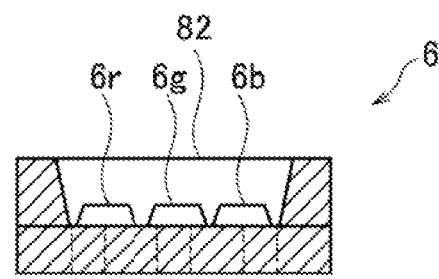
FIG. 3C is a side view of the light source 6 in a main scanning direction.

The light source 6 is, for instance, a commercially available surface-mounted LED. FIG. 3A is a plan view schematically showing the configuration of the light source 6, exemplifying a surface-mounted LED. FIG. 3B is a sectional view taken along the main scanning direction of the light source 6. FIG. 3C is a sectional view taken along the sub-scanning direction of the light source 6. As shown in FIGS. 3A to 3C, the light source 6 has a light-emitting surface 82 from which light from the light-emitting elements $6r$, $6g$ and $6b$ is emitted.

The image sensor 7 is an image sensor IC array. In the image sensor IC array, a certain number of image sensor ICs 9 are linearly mounted on the circuit board 5. The image sensor ICs 9 include light-receiving elements (the light-receiving elements are also referred to as photoelectric conversion elements) in conformity with the reading resolution of the image sensor unit 1 according to Embodiment 1. Accordingly, the image sensor 7 is formed such that these light-receiving elements are linearly arranged in the main scanning direction. In the image sensor 7, the light-receiving elements may be arranged in a plurality of lines, as with a staggered arrangement, only provided that the elements are arranged linearly. The other parts of the configuration are not specifically limited. Conventionally known various image sensor ICs can be adopted as the image sensor ICs 9.

As shown in FIG. 2, the light source 6 and the image sensor 7 are mounted on the upper surface of the circuit board 5. The circuit board 5 has a rectangular configuration elongated in the main scanning direction. The light source 6 is mounted in proximity to an end, in the main scanning direction, of the circuit board 5, and capable of emitting light upward.

Figure 4:
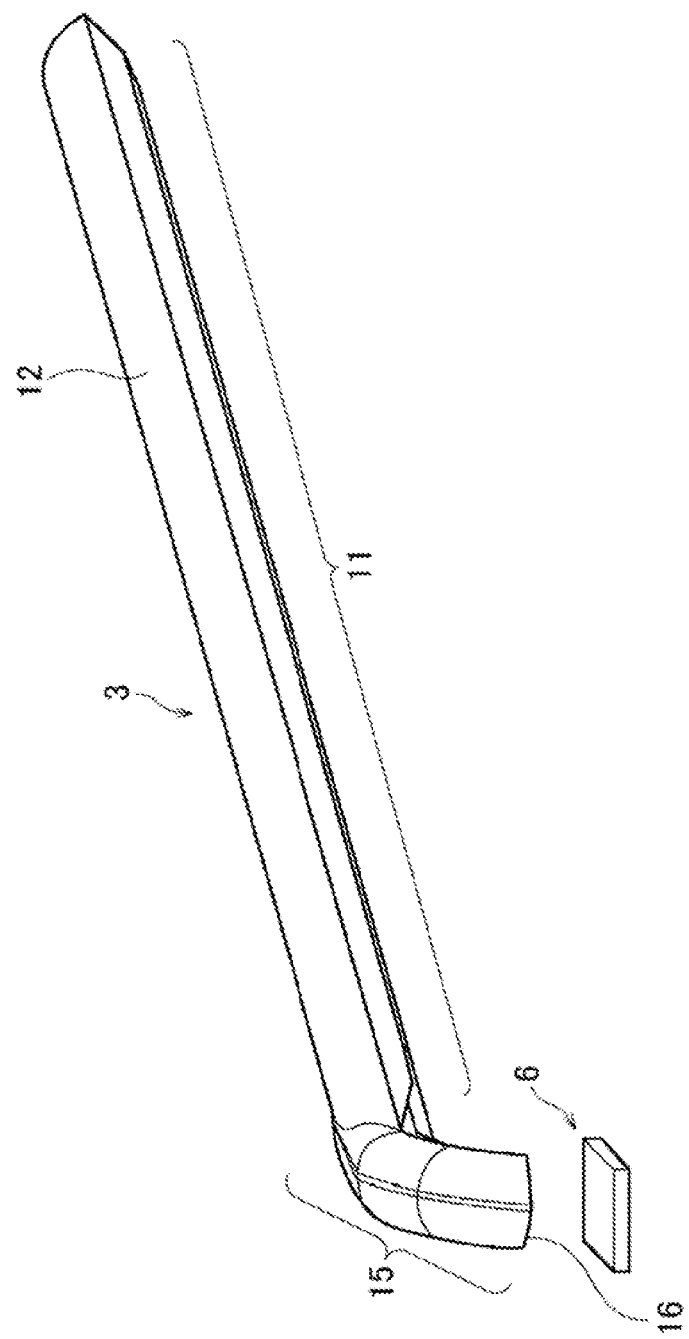
FIG. 4 is an external perspective view schematically showing a configuration of a light guide.

The light guide 3 is an optical element that linearizes the light emitted from the light source 6 to irradiate the reading line S on the sheet P. FIG. 4 is an external perspective view showing the configuration of the light guide 3. The light guide is made of transparent material, such as glass or resin material. The transparent resin material may be an acrylic resin material. As shown in FIG. 4, the light guide 3 includes a light emitter 11 and a bent portion 15.

The light emitter 11 is formed to be substantially rod-shaped elongated in the main scanning direction. A light emitting surface 12 is formed on a surface of the light emitter 11. The light emitting surface 12 is an elongated surface provided in the main scanning direction of the light emitter 11, and a surface from which linear light is emitted toward the reading line S on the sheet P. The light emitting surface 12 condenses the light onto the reading line S on the sheet P. Accordingly, for instance, this surface is formed into a curved surface convex toward the reading line S. The light diffusing surface 13 is an elongated surface provided along the main scanning direction of the light emitter 11, and reflects and diffuses light in the light guide 3. The diffusing surface 13 is provided opposite to the light emitting surface 12. A patterned shape is formed on this surface by, for instance, serigraphy. The other surfaces serve as reflective surfaces. The dimensions of the light emitter 11 and the light emitting surface 12 in the main scanning direction are set in conformity with the width of the sheet to be read. For instance, in the case of supporting reading of an A4-sized sheet, the dimension of the light emitting surface 12 in the main scanning direction is set in conformity with the width of an A4-sized sheet. As shown in FIG. 2, the light emitter 11 is arranged such that the longitudinal direction of the light emitting surface is substantially parallel to the longitudinal direction of the light condenser 4.

The bent portion 15 guides the light emitted from the light source 6 into the light emitter 11. An end face of the bent portion 15 is a light-incident surface 16, on which the light emitted from the light source 6 is incident. The light-incident surface 16 is opposed to the light-emitting surface 82 of the light source 6 substantially in parallel thereto with a narrow separation so as to allow the light emitted from the light source 6 to efficiently enter into the light guide 3. Thus, the bent portion 15 is continuous to an end of the light emitter 11, and bent or curved toward the light-emitting surface 82 of the light source 6 mounted on the circuit board 5. Furthermore, the bent portion 15 is bent or curved from an end of the light emitter 11 also in the sub-scanning direction such that the light-incident surface 16 is opposed to the light-emitting surface of the light source 6. Accordingly, the position of the light-incident surface 16 that is nearest the image sensor 7 is disposed nearer than the position of the light emitter 11 that is nearest the image sensor 7 in the sub-scanning direction.

Likewise, the opposite position of the light-incident surface 16 to the image sensor 7 is disposed nearer the image sensor 7 than the position of the light emitter 11 opposite to the image sensor 7 in the sub-scanning direction. In other words, the center position in the sub-scanning direction of the light-incident surface 16 and the center position in the sub-scanning direction of the light emitter 11 deviate from each other in the sub-scanning direction. Here, "the center position in the sub-scanning direction" of each of the light-incident surface 16 and the light emitter 11 is the center position between the opposite ends in the sub-scanning direction. More specifically, this position is the center position between positions separated farthest from each other in the sub-scanning direction (maximum external size) on a contour line (outline) in plan view in the direction of the normal (upward direction) (in plan view of a surface on which the light source 6 and the image sensor 7 are mounted on the circuit board 5). Local or partial unevenness may sometimes be on the light-incident surface 16 and the light emitter 11. However, the center line $C_e$ illustrated here is the center line in the case assuming that such unevenness does not exist. Thus, the bent portion 15 is bent or curved in the downward direction and sub-scanning direction. Accordingly, in both the case where the light guide 3 is viewed in the sub-scanning direction and the case of being viewed in the upward direction (or downward direction), the bent portion 15 has an appearance bent or curved toward the light emitter 11. Such shape is hereinafter referred to as a bent shape. It is preferred that the shape or dimensions of the light-incident surface 16 be set to allow the light from the light source to efficiently enter in consideration of the shape and dimensions of the light-emitting surface 82 of the light source 6. The degrees of bending or curve of the bent portion 15 in the sub-scanning direction is set such that the light-incident surface 16 is opposed to the light-emitting surface 82 of the light source 6 to allowing the light incident on the light-incident surface, on the basis of the positional relationship between the light emitter 11 of the light guide 3 and the light-emitting surface 82 of the light source 6. For instance, the degrees of bending or curve are set on the basis of the distance between the light emitter of the light guide 3 and the light-emitting surface 82 of the light source 6 in the sub-scanning direction and the like.

Furthermore, the image sensor unit 1 according to Embodiment 1 is provided with a mounting unit for mounting the image reader 10 (to be described later) or the image forming apparatus 50 (to be described later), and a connector for electric connection to the image reader 10 or the image forming apparatus 50, in a manner protruding from the frame 2. The configurations of the mounting unit and the connector are not specifically limited. The mounting unit may have any configuration that can attach the image sensor unit 1 according to Embodiment 1 to the image reader 10 or the image forming apparatus 50. The connector may have any configuration that can connect the image sensor unit 1 according to Embodiment 1 to a prescribed device of the image reader 10 or the image forming apparatus 50 in a manner capable of transmitting and receiving power and an electric signal.

Figure 5:
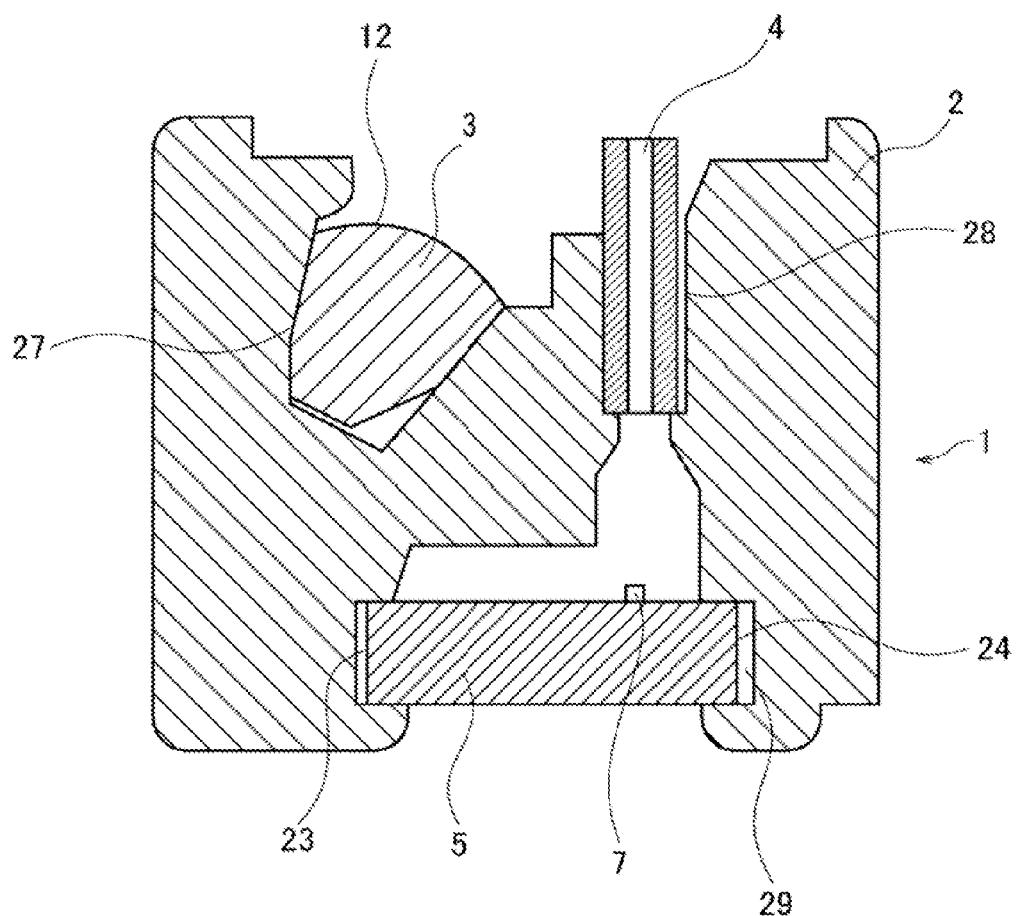
FIG. 5 is a sectional view taken along line V-V in FIG. 1.
Figure 6:
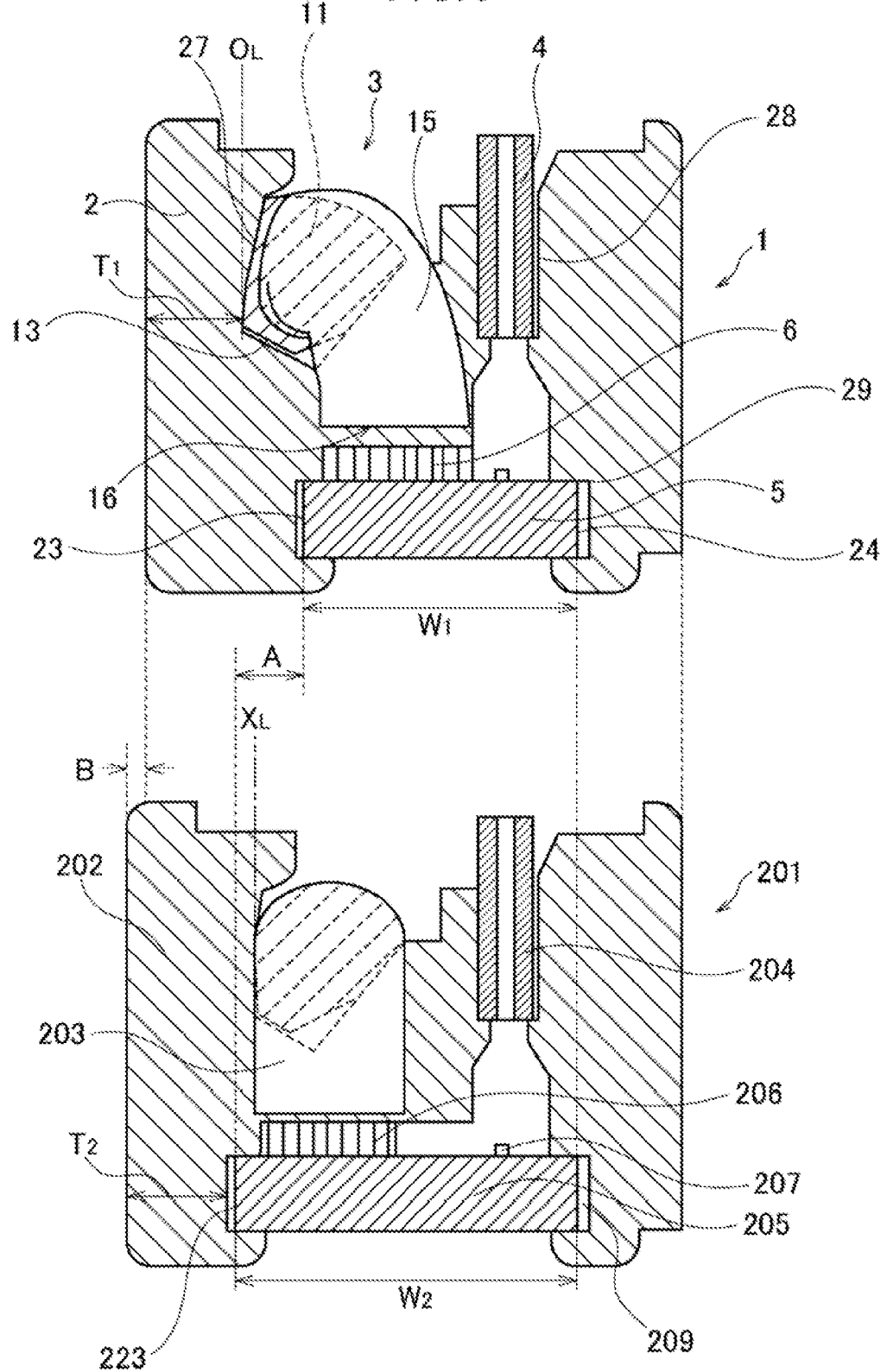
FIG. 6 is a diagram showing the light source and a bent portion of the light guide in a superimposed manner on FIG. 5, and also showing a conventional image sensor unit.

Next, a fixing configuration of the image sensor unit 1 according to Embodiment 1 will be described with reference to FIGS. 5 and 6. FIG. 5 is a sectional view taken along line V-V in FIG. 1. FIG. 6 is a diagram showing the light source 6 and the bent portion 15 of the light guide 3 in a superimposed manner on FIG. 5. The upper part of FIG. 6 shows the image sensor unit 1 according to Embodiment 1. The lower part of FIG. 6 shows, for comparison, an image sensor unit 201 in which the light guide has no bent shape and the bent portion is not bent or curved in the case where the light guide is viewed in the Z direction.

As shown in FIGS. 5 and 6, the light guide 3 is accommodated in the light guide holder 27, the light condenser 4 is accommodated in the light condenser holder 28, and the circuit board 5 is accommodated in the circuit board holder 29. The light guide holder and the light condenser holder 28 are spaces open in the upward direction. The light guide holder 27 and the light condenser holder 28 are formed in a manner arranged in the sub-scanning direction. The circuit board holder 29 is a space open in the downward direction. The light guide holder 27, the light condenser holder 28 and the circuit board holder 29 are substantially parallel to each other. Accordingly, the light emitter 11 of the light guide 3, the light condenser 4, and the image sensor 7 mounted on the circuit board 5 are substantially parallel to each other. The light condenser holder and the circuit board holder 29 communicate with each other so as to allow light to pass.

The bent portion 15 of the light guide 3 is bent or curved in the sub-scanning direction (see FIGS. 2, and 6). Accordingly, the center of the light-incident surface 16 of the light guide 3 is closer to the image sensor 7 than the center of the light emitter 11 in the sub-scanning direction. The bent portion 15 of the light guide 3 is bent or curved from the light emitter 11 in the downward direction. The light-incident surface 16 is oriented in the downward direction. The light source 6 is mounted opposite to the light-incident surface 16 of the light guide 3 with a narrow separation in order to allow light to be efficiently incident on the light-incident surface 16 of the light guide 3. Accordingly, as shown in the upper part of FIG. 6, in comparison with the configuration where the bent portion 15 of the light guide 3 is not bent or curved in the sub-scanning direction (the lower part of FIG. 6), the light source 6 can be mounted in proximity to the image sensor 7 in the sub-scanning direction. This allows the dimensions of the circuit board 5 in the sub-scanning direction to be reduced. This in turn facilitates reduction in size, weight and cost of the circuit board 5. Reduction in dimension of the circuit board 5 in the width direction allows reduction in dimension in the width direction and reduction in size of the image sensor unit 1 according to Embodiment 1. Such configuration successfully reduces the width $W_1$ of the circuit board 5. More specifically, the width of the board of a conventional company product having about 10 mm can be reduced to about 6 mm. Note that, as the LED, a commercially available product that has the external planar shape of a rectangle having a side of about 3.5 mm and includes six terminals is adopted.

It is a matter of course that improvement is made and the design is changed so as to allow the circuit width to be reduced in consideration of the wiring pattern on the circuit board, and the mounting arrangement of chip electronic components connected thereto, and wire-bonding connection to the image sensor IC 9. Furthermore, the mounting arrangement is designed such that the external shape of the light source 6 in plan view does not protrude from the width of the circuit board 5 in the sub-scanning direction, as shown in FIGS. 2 and 5. Such change in design can be entirely supported by conventional mounting procedures. Furthermore, the bent portion of the light guide 3 is thus bent in the sub-scanning direction. This allows the light source 6 to be close to the image sensor IC 9 in the sub-scanning direction. Accordingly, the light from the light source 6 can be efficiently incident on light guide 3.

A specific mode of the image sensor unit 1 according to Embodiment 1 is as follows. A line $O_L$ in the upper part of FIG. 6 is the contour line (outline) of the light emitter 11, and a tangent line thereof in the Z direction at a part farthest from the light condenser 4. A line $X_L$ in the lower part of FIG. 6 is the contour line of the light emitter of the light guide 203, and a tangent line thereof in the Z direction at a part farthest from the light condenser 204. For the sake of convenience of description, the lines $O_L$ and $X_L$ are hereinafter referred to as distant contour lines. The distant contour line $O_L$ indicates a part farthest from the light condenser 4 of the light emitter 11 in plan view in the direction of the normal (upward direction). Likewise, the distant contour line $X_L$ indicates a position farthest from the light condenser 204 of the light emitter of the light guide 203 in plan view in the direction of the normal (upward direction).

As shown in the upper part of FIG. 6, in the image sensor unit 1 according to Embodiment 1, the distance between the light source 6 and the image sensor 7 can be reduced in the sub-scanning direction. Accordingly, the dimension $W_1$ of the circuit board 5 in the sub-scanning direction can be reduced from the dimension $W_2$ by a dimension denoted by a symbol A. Thus, between end faces 23 and 24 of the circuit board 5 in the sub-scanning direction, the end face arranged substantially below the light guide 3 is disposed nearer light condenser 4 in the sub-scanning direction than the distant contour line $O_L$ of the light emitter 11 of the light guide 3. The thickness $T_1$ of the side wall of the frame 2 becomes the minimum at a position corresponding to a part (distant contour line $O_L$) farthest from the light condenser 4 in the light emitter 11 of the light guide 3. In contrast, in the image sensor unit 201 in the lower part of FIG. 6, the bent portion of the light guide 203 is not bent or curved in the sub-scanning direction. Accordingly, the distance between the image sensor 207 and the light source 206 in the sub-scanning direction is increased in the sub-scanning direction. This increases the dimension $W_2$ of the circuit board 205 in the sub-scanning direction in comparison with the dimension $W_1$. Accordingly, the end face 223, nearer the light guide 203, between the end faces of the circuit board 205 in the sub-scanning direction is disposed farther than a part (distant contour line $X_L$) farthest from the light condenser 204 in the light emitter 11 of the light guide 3 in view from the light condenser 204. Thus, the thickness $T_2$ of the side wall of the frame 202 becomes the minimum at a position corresponding to the circuit board holder 209. In view of mechanical strength of the frame, the frame is designed attaching importance to the minimum thickness. If it is assumed that the thicknesses $T_1$ and $T_2$ are set to be the same, the dimension in the sub-scanning direction of the image sensor unit 1 according to Embodiment 1 can be reduced more than the image sensor unit 201 by a dimension denoted by B. The bent portion 15 of the light guide 3 is thus bent or curved also in the sub-scanning direction, thereby allowing the dimension of the frame 2 in the sub-scanning direction to be smaller than that in the case of using the light guide 203 without the bent shape.

Figure 7:
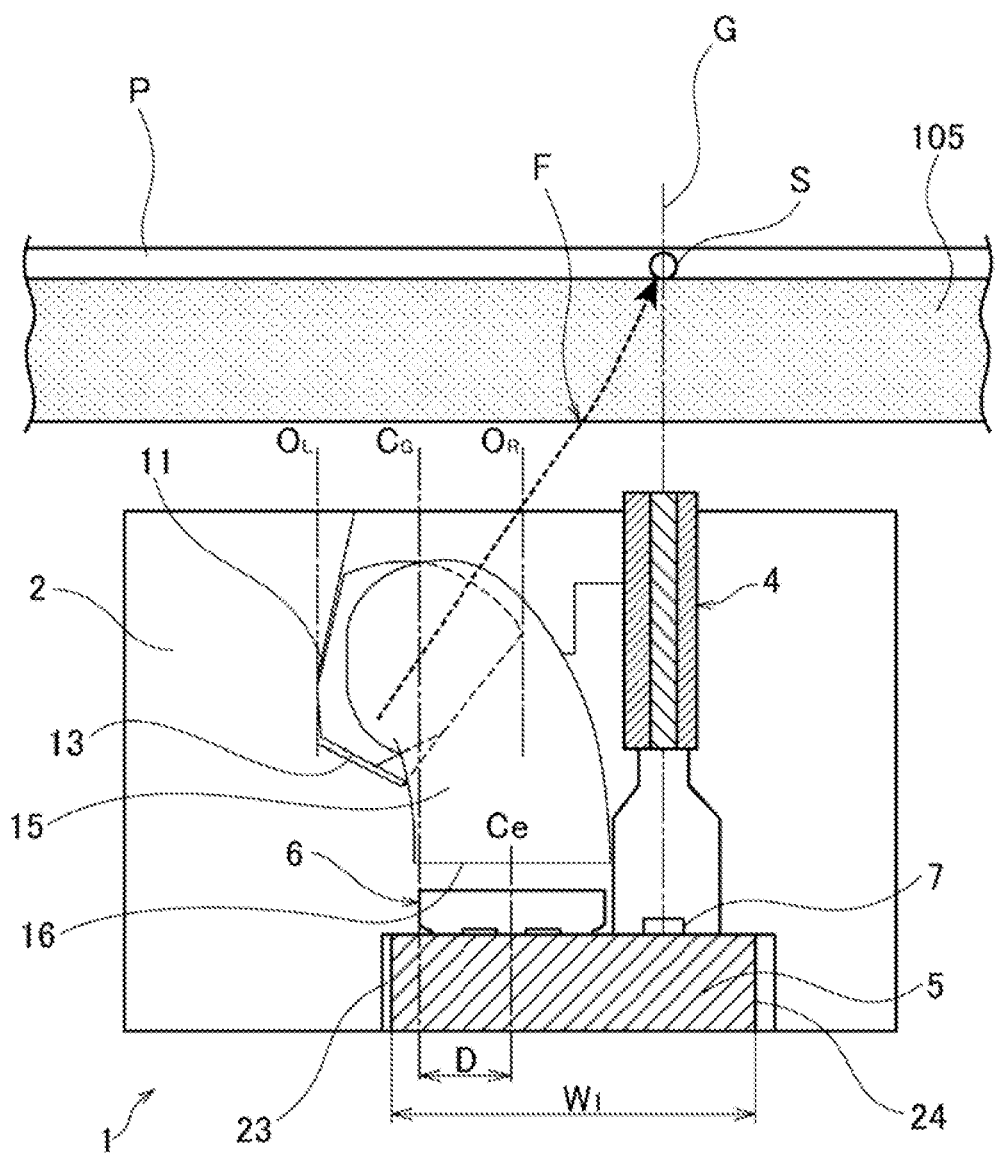
FIG. 7 is a schematic sectional view showing the configuration of the image sensor unit according to Embodiment 1, and showing a sectional view of the light guide at a light emitter and a sectional view thereof at the bent portion in a superimposed manner.

Next, the positional relationship of the light guide 3, the light source 6 and the circuit board 5 in the sub-scanning direction will be described in detail with reference to FIG. 7. FIG. 7 is a schematic sectional view showing the configuration of the image sensor unit 1 according to Embodiment 1, and shows a sectional view of the light guide 3 at the light emitter 11 and a sectional view thereof at the bent portion 15 in a superimposed manner. Note that FIG. 7 shows a state where the image sensor unit according to Embodiment 1 is incorporated in the image reader 10 or the image forming apparatus 50 (to be described later). Thus, there is a sheet holder 105 for supporting the sheet P above the image sensor unit 1. The sheet holder 105 is, for instance, a transparent glass plate. The light emitted from the light source 6 is incident on the light-incident surface 16 into the light guide 3, repeats reflection at the bent portion 15 and propagates to the light emitter 11. The light, having propagated to the light emitter 11, is reflected and diffused in the light emitter 11, and emitted from the light emitting surface 12 to the reading line S on the sheet P by means of an optical function of the light emitter 11. An arrow F in FIG. 7 schematically indicates the main flux of light from the light emitting surface 12. As shown in FIG. 7, the reading line S on the sheet P is irradiated with the main flux of light from the light emitting surface 12. The optical axis G of the light condenser 4 passes through the reading line S on the sheet P in the upward direction, while passing through the image sensor 7 in the downward direction. Accordingly, the light reflected by the reading line S on the sheet P travels along the optical axis G, passes through the light condenser 4, and focused onto the surface of the image sensor 7.

The line $O_L$ in FIG. 7 is the distant contour line of the light guide 3 (see the upper part of FIG. 6). A line $O_R$ in FIG. 7 is the contour line of the light emitter 11, and a tangent line thereof in the Z direction at a part nearest the light condenser 4. For the sake of convenience of description, the line $O_R$ is referred to as a "proximal contour line". That is, the distant contour line $O_L$ and the proximal contour line $O_R$ indicate the position of the contour line (outline) of the light emitter 11 of the light guide 3 in the sub-scanning direction, in plan view in the direction of the normal (upward direction) of the upper surface of the circuit board 5 (the surface on which the light source 6 and the image sensor 7 are mounted). A line $C_G$ in FIG. 7 indicates the center position between the distant contour line $O_L$ and the proximal contour line $O_R$ in plan view in the direction of the normal (upward direction) of the upper surface of the circuit board 5. The line $C_G$ is the center line of the light emitter 11 of the light guide 3 in the sub-scanning direction. The light-emitting surface 82 of the light source 6 is oriented in the upward direction, and opposed to the light-incident surface 16 of the light guide 3 with a narrow separation. The line $C_e$ in FIG. 7 is the center line of the light-emitting surface 82 of the light source 6, and the center line (optical axis) of the flux of the light emitted from the light source 6. Partial or local unevenness may sometimes be formed on the light emitter 11 of the light guide 3. For instance, protrusions and depressions are sometimes formed on the light emitter 11 of the light guide 3. The distant contour line $O_L$, the proximal contour line $O_R$ and the center line $C_G$ are lines in the case of ignoring partial or local unevenness (in the case assuming that unevenness does not exist).

As shown in FIG. 7, the center line $C_e$ of the light-emitting surface 82 of the light source 6 is disposed nearer the image sensor 7 by a distance D than the center line $C_e$ of the light emitter 11 of the light guide 3 in the sub-scanning direction, in plan view in the direction of the normal (upward direction) of the circuit board 5. That is, the center line $C_e$ of the light-emitting surface 82 of the light source 6 is disposed near the image sensor in the sub-scanning direction than any position on the center line $C_G$ of the light emitter 11 of the light guide 3 (the center line in the case of ignoring partial or local unevenness). This allows the position at which the light source 6 is mounted on the circuit board 5 to be brought closer to the optical axis G of the light condenser 4 in the sub-scanning direction. Accordingly, the dimension $W_1$ of the circuit board 5 in the sub-scanning direction can be reduced. As a result, this can reduce the dimensions of the frame 2 and the image sensor unit 1 in the sub-scanning direction, and facilitate reduction in size, weight and cost.

The end face 23 of the circuit board 5 nearer the light guide 3 between the two end faces (sides in the longitudinal direction) 23 and 24 in the sub-scanning direction is disposed nearer the optical axis G of the light condenser 4 than the distant contour line $O_L$ of the light guide 3, in the sub-scanning direction. That is, the end face 23 of the circuit board 5 near the light guide 3 is nearer the optical axis G of the light condenser 4 than the contour line (outline) distant from the light condenser 4 of the light emitter 11 of the light guide 3, in plan view of the surface of the circuit board 5 on which the light source 6 and the image sensor 7 are mounted, in the direction of the normal (upward direction).

Accordingly, in comparison with the configuration where the end face 23 of the circuit board 5 in the sub-scanning direction is disposed farther from the light condenser 4 than the distant contour line $O_L$ of the light guide 3 (the lower part of FIG. 6), the dimension of the frame 2 in the sub-scanning direction can be reduced. That is, in order to reduce the dimension of the frame 2 in the sub-scanning direction, it is required to reduce the dimension $W_1$ of the circuit board 5 in the sub-scanning direction. For the sake thereof, the light source 6 is required to be mounted so as to be close to the image sensor 7 in the sub-scanning direction. In Embodiment 1 of the present invention, the bent portion 15 of the light guide 3 is bent or curved in the sub-scanning direction. Accordingly, the light-incident surface 16 of the light guide 3 is brought close to the image sensor 7 in the sub-scanning direction. This allows the light source 6 to be brought close to the image sensor 7 (i.e., the optical axis G of the light condenser 4). Accordingly, the end face 23 of the circuit board 5 nearer the light condenser 4 in the sub-scanning direction between the two end faces 23 and 24 can be disposed nearer the light condenser 4 than the distant contour line $O_L$ of the light guide 3 in the sub-scanning direction.

Figure 8:
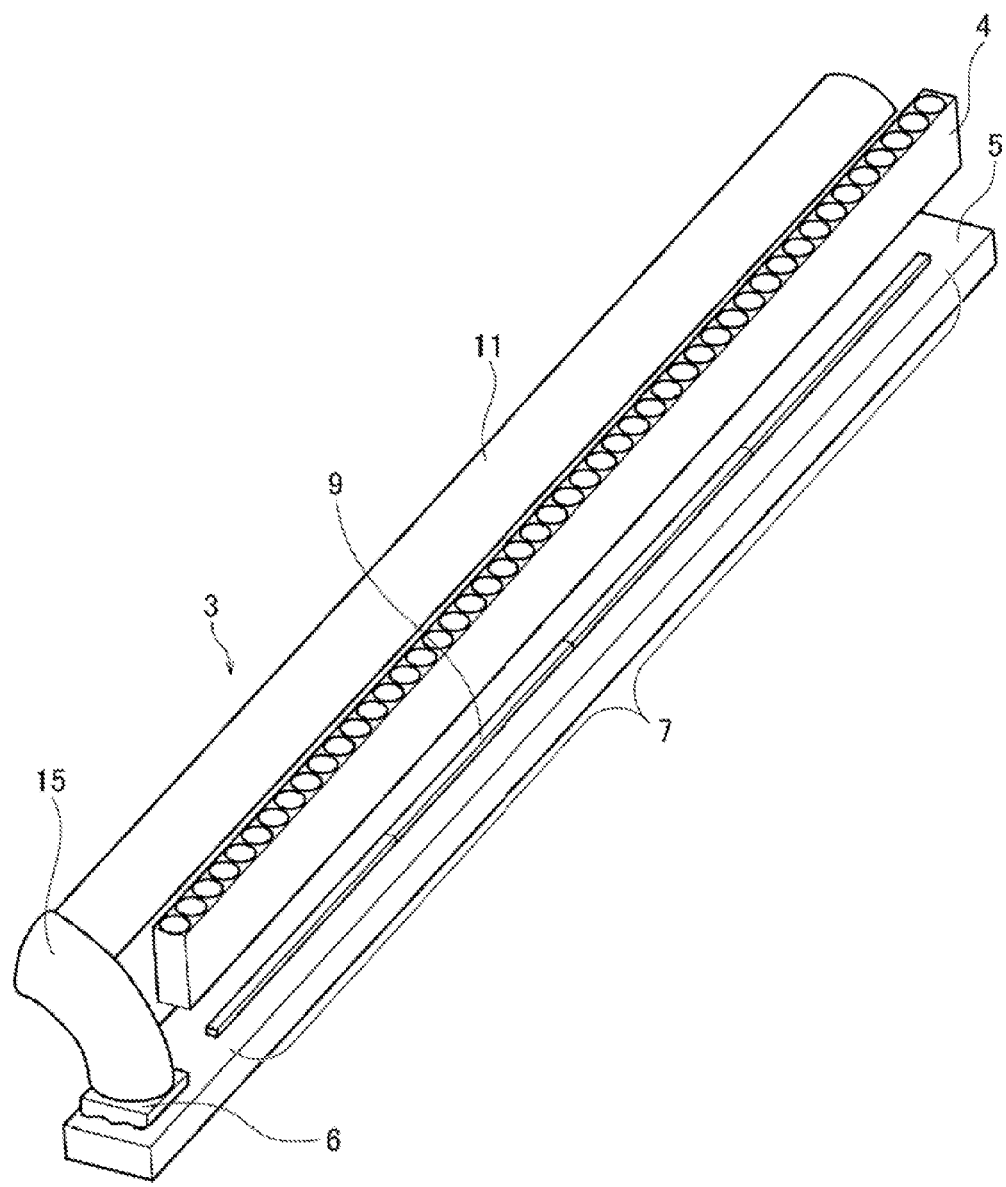
FIG. 8 shows a configuration in which the center line of the light source is brought closer to an image sensor IC than that in the configuration shown in FIG. 2.

FIG. 8 shows a configuration in which the center line $C_e$ of the light source 6 is brought closer to image sensor 7 than that in the configuration shown in FIG. 2. As shown in FIG. 8, increase in the degree of bending or curve of the bent portion 15 of the light guide 3 can further bring the center line $C_e$ of the light source 6 close to the image sensor 7. More specifically, the present invention encompasses implementation where the light source 6 is arranged at a position overlapping with a line prolonged from the image sensor 7 in the longitudinal direction, or at a position close to the end face 24 of the circuit board. Such a configuration can facilitate further reduction in size, weight and cost of the dimension of the circuit board 5 in the sub-scanning direction. Accordingly, this can further facilitate reduction in size, weight and cost of the image sensor unit 1 according to Embodiment 1. Even in the case where the center of the light emitted from the light source and the center of the light-incident surface 16 of the light guide 3 do not match on the optical axis, reduction in size and weight of the image sensor unit can be made. This case does not depart from the scope of the present invention.

Embodiment 2

Next, an image sensor unit according to Embodiment 2 will be described with reference to FIGS. 9 and 10. The configurational elements identical to those in Embodiment 1 are assigned with the identical symbols. The description thereof is omitted.

Embodiment 2 includes a configuration capable of preventing or suppressing light leakage at the bent portion 15 of the light guide 3. FIG. 9 is a diagram showing the bent portion 15 of the light guide 3 and therearound extracted from the image sensor unit 1 according to Embodiment 2, viewed in the sub-scanning direction. FIG. 10 is an external perspective view schematically showing the configuration of the image sensor unit 1 according to Embodiment 2. As shown in FIGS. 9 and 10, the light guide holder 27 is a space open at the top. The light guide 3 is accommodated in this space. As shown in FIG. 9, the light emitted from the light source 6 enters into the light guide 3 from the light-incident surface 16, which is an end face of the bent portion 15 that is oriented in the downward direction. The light, having entered into the light guide 3, travels toward the outer surface (surface at the outside in the direction of the radius of the bending or curve) of the bent portion 15. A part of the light reaching the outer surface at an angle smaller than the total reflection angle in the light having entered into the light guide 3 leaks out of the light guide 3 without total reflection at the outer surface 17. Accordingly, the dimensions and shape of the bent portion 15 is set such that total reflection of the light as much as possible can be occurred at the outer surface 17 of the bent portion 15.

Figure 9:
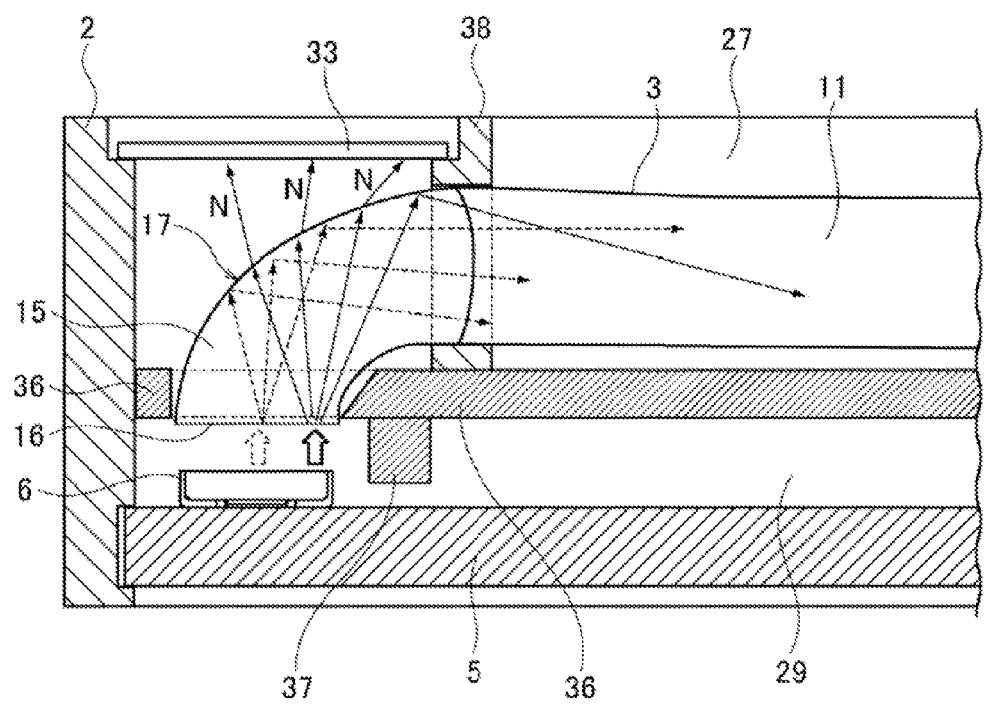
FIG. 9 is a diagram showing the bent portion of the light guide and therearound extracted from the view of an image sensor unit according to Embodiment 2, viewed in the sub-scanning direction.

As shown in FIG. 9, the outer surface 17 of the bent portion 15 is formed into a curved surface that is smooth and continuous over the whole. The entire surface connected from the light-incident surface 16 to the light emitter 11 is formed into a smooth and continuous curved surface. The bent portion 15 is bent or curved in the vertical direction and the sub-scanning direction. Thus, the contour of the outer surface 17 (contour of the surface at the outside in the direction of the radius of the bending or curve in the vertical direction) in view of a section of the bent portion 15 along a plane of the vertical and sub-scanning directions (Y-Z plane) is a continuous curve. Likewise, the contour of the outer surface 17 (contour of the surface at the outside in the direction of the radius of the bending or curve in the vertical direction) in view of a section of the bent portion 15 along a plane of the main scanning and sub-scanning directions (X-Y plane) is also a continuous curve.

As shown in FIG. 9, for instance, the total reflection of most of the light from the center of the light source 6 (indicated by broken lines in FIG. 9) is occurred at the outer surface 17 of the bent portion 15 and the light is propagated to light emitter 11. Note that light from a peripheral portion of the light source 6 for instance as shown by solid arrows in FIG. 9 travels in the bent portion and reaches the outer surface 17. However, since the incident angle onto the outer surface 17 is small, the total reflection of the light is not occurred and a part thereof becomes leakage light N leaking out of the light guide 3. Such leakage light N has a possibility of causing following problems (1) to (3). (1) Reduction in light guiding. (2) The leakage light N reaches the reading line S on the sheet P and disturbs illuminance uniformity at the reading line S on the sheet P. (3) The leakage light N travels as stray light in an unexpected route in the frame 2 and reaches a light-receiving part of the image sensor 7, thereby degrading the performance of the image sensor unit 1. In order to address these problems, the leakage light leaking around from the light source 6 or the bent portion 15 is blocked by the circuit board 5 at the bottom in the downward direction, and blocked by the structures of the light guide holder and the circuit board holder 29 of the frame 2 in the X and Y directions. As shown in FIGS. 9 and 10, as to the light guide holder 27, a boundary wall 38 is formed at a position corresponding to the boundary between the light emitter 11 of the light guide 3 and the bent portion 15, and, as to the circuit board holder 29, a boundary wall 37 is formed at a position corresponding that between the light source 6 and the image sensor 7, in a manner integral with the frame 2. The boundary wall 38 is formed so as not to prevent fitting operation in the upward direction of the light guide 3 and so as to minimize the separation of the light guide 3 from the contour after the fitting. An inter-chamber wall 36 by means of the frame 2 is provided between the circuit board holder 29 and the light guide holder 27 accommodating the bent portion, above the light source 6 mounted on the circuit board 5. An opening is provided at the inter-chamber wall 36. The light-incident surface 16 of the bent portion 15 is inserted in the upward direction into the opening, thus allowing the light from the light source 6 to enter. Such a frame structure suppresses the light emitted from the light source 6 from directly reaching the light guide holder 27. Even with such measures, the top of the light guide holder accommodating the bent portion 15 is open. A part of the leakage light N can be emitted from the opening to the outside of the frame 2. In order to reduce the leakage light N in FIG. 9, it is preferred that the outer surface 17 at the outer part of the curve of the bent portion 15 be a continuous curved surface. For instance, in the case of forming the bent portion 15 so as to include a plurality of planes, the distribution of flux of the leakage light N becomes nonuniform at a part where two of the planes intersect with each other, and the leakage light may be increased in comparison with the case of formation into continuously curved surface. In this view, it is a matter of course that the surface at the inside of the curve of the bent portion 15 is preferably finished into a continuously curved surface as much as possible. Accordingly, the continuous curve of the contour of the section of the bent portion 15 in the sub-scanning direction is analogously effective for reducing the leakage light N.

Figure 10:
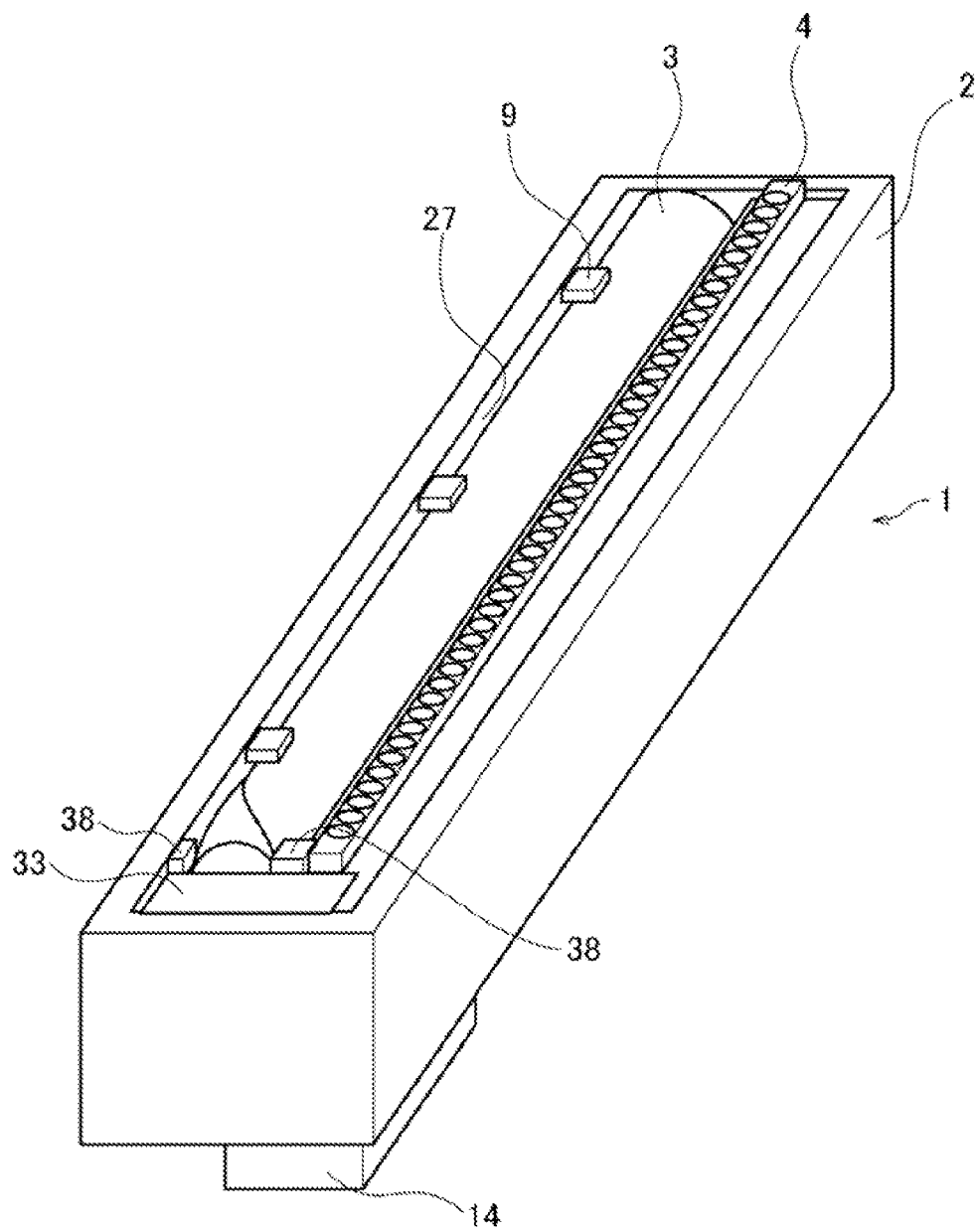
FIG. 10 is an external perspective view schematically showing a configuration of the image sensor unit according to Embodiment 2.

Furthermore, as shown in FIGS. 9 and 10, the image sensor unit 1 according to Embodiment 2 is provided with a light shield 33 so as to block the top of the light guide holder 27 accommodating the bent portion 15 of the light guide 3. The light shield 33 blocks the leakage light N from the bent portion 15. The light shield 33 is a plate-like or sheet-like member. For instance, the light shield 33 may be PET resin colored with black and formed into a plate or sheet. More specifically, as shown in FIG. 10, the light guide 3 is pressed from the top to be accommodated into the light guide holder 27. The light guide 3 accommodated in the light guide holder is fixed to the frame 2 by means of elasticity of the light guide holding tabs 9. Furthermore, the light shield 33 is attached to the frame 2 from above the bent portion 15 so as to block the opening at the top of the light guide holder 27. Thus, the frame 2 of the image sensor unit 1 according to Embodiment 2 is a space open at the top, and includes the light guide holder 27 accommodating the light guide 3, and the light shield blocking the top of the bent portion accommodated in the light guide holder 27. According to such a configuration, the leakage light from the light source 6 and the bent portion 15 of the light guide 3 is blocked by the circuit board 5 at the bottom, and blocked by the frame 2 or the boundary wall 38 in the X and Y directions. As shown in FIG. 10, the leakage light N traveling in the upward direction is blocked by the light shield 33. A plate-like or sheet-like shape of the light shield facilitates fabrication and installation. Accordingly, the shield does not impede reduction in size of the image sensor unit 1 according to Embodiment 2, and can prevent or suppress of the light from leaking. This configuration further effectively facilitates reduction in size and weight in comparison with the case of addressing the leakage light N by a structure where a reflective member made of white material covers the entire bent portion 15.

Figure 11:
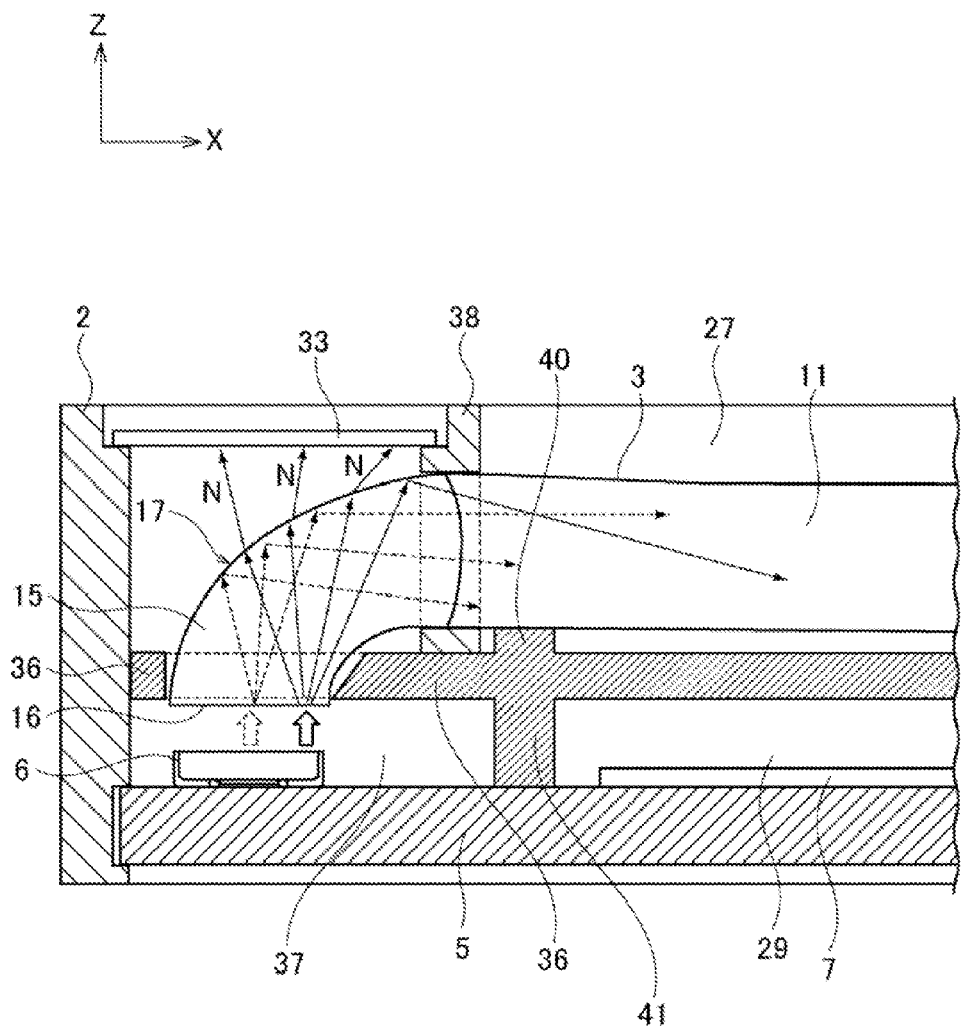
FIG. 11 is a diagram showing a bent portion of a light guide and therearound extracted from an image sensor unit according to another mode of Embodiment 2, viewed in the sub-scanning direction.

Another mode of Embodiment 2 will now be described with reference to FIG. 11. This mode of Embodiment 2 has a configuration capable of preventing or suppressing the light from leaking out of the light source 6 and of easily positioning the light guide 3. FIG. 11 is a diagram showing the bent portion 15 of the light guide 3 and therearound extracted from the image sensor unit 1 according to the other mode of Embodiment 2, viewed in the sub-scanning direction. The configurational elements identical to those in Embodiment 2 are assigned with the identical symbols. The description thereof is omitted.

In the circuit board holder 29, a boundary wall is formed integrally with the frame 2 at a position corresponding to that between the light source 6 and the image sensor 7. The boundary wall protrudes from the inter-chamber wall 36 toward the circuit board 5 (to the downward direction). The distal end of the boundary wall 41 (the bottom end in FIG. 11) is contact with the surface of the circuit board 5. Accordingly, the leakage light from the light source 6 is blocked by the boundary wall 41, which can prevent the light from being incident on the image sensor 7. It is suffice that the boundary wall 41 has the configuration that partitions the circuit board holder 29 into a part where the image sensor 7 resides and a part where the light source 6 resides. This configuration can prevent the leakage light from the light source 6 from being incident on the image sensor 7, thereby allowing the reading accuracy to be improved. Furthermore, the inter-chamber wall 36 is provided with a supporting protrusion 40 protruding toward the light guide 3 (in the upward direction) in a manner integral with frame 2. More specifically, as shown in FIG. 11, the supporting protrusion 40 is contact with a boundary between the light emitter 11 of the light guide 3 and the bent portion 15, or a part of the boundary on the side of the light emitter that is opposite to the inter-chamber wall 36, for supporting. According to such a configuration, in a process of fixing the light guide 3 to the light guide holder 27 of the frame 2, the light guide 3 is inserted from the top of the light guide holder 27 to be contact with the supporting protrusion 40, only with which the light guide 3 can be positioned with respect to the frame 2 in the Z direction.

Figure 12:
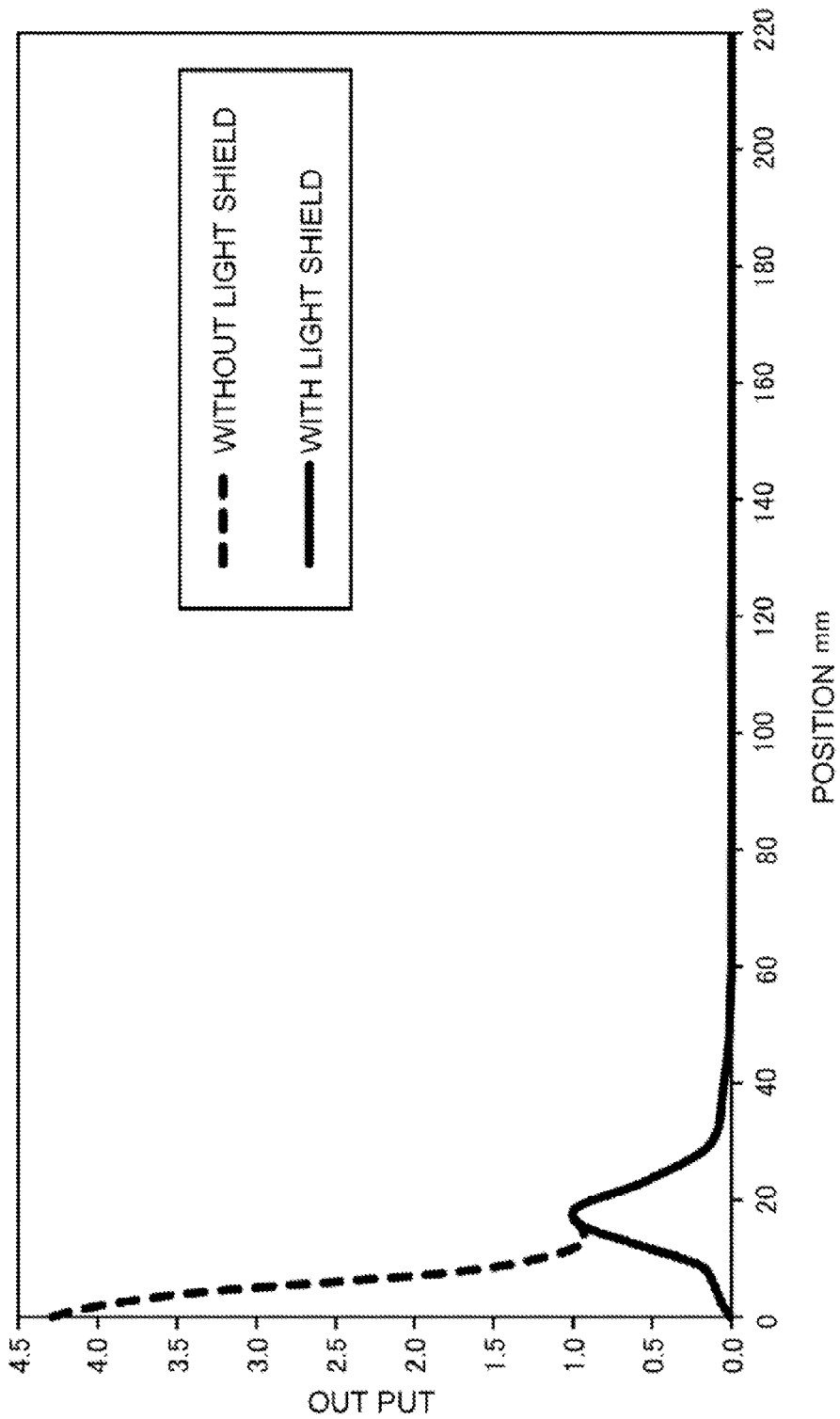
FIG. 12 is a graph showing luminances of an embodiment provided with a light shield and a comparative example without the light shield.

Advantageous effects of the light shield 33 will now be described. FIG. 12 is a graph showing luminances of an embodiment provided with a light shield and a comparative example without the light shield. The abscissa indicates the position of the image sensor 7. The "0 mm" indicates the position of the end portion nearer the light source 6 and the bent portion 15 of the light guide 3. The ordinate indicates output of the image sensor 7 of each of the embodiment and the comparative example. The output is nondimensionalized with respect to the maximum value of the output of the image sensor 7 in the embodiment. In this embodiment, a range in the bent portion 15 of the light guide 3 from the end nearer the light source 6 to the length of 5 mm or more is covered with the light shield 33.

As shown in FIG. 12, in the comparative example, the output value reaches the maximum at the end nearer the light source 6. The output decreases as being apart from this end. It is considered that, in the comparative example without the light shield, the output value is increased by the leakage light in proximity to the end nearer the light source 6.

In contrast, in the embodiment, the maximum value of the output significantly decreases in comparison with that in the comparative example. Thus, in the embodiment, the light shield 33 prevents or suppresses the leakage light from being incident on the image sensor 7. The output value is small at the end nearer the light source 6, and reaches the maximum at a position apart from this end. It is considered that this is because the light shield 33 prevents or suppresses the leakage light from being incident on the image sensor 7 at the end nearer the light source 6 and in immediate proximity thereto.

As described above, it is confirmed that the light shield 33 can prevent or suppress the leakage light from being incident on the image sensor 7.

Embodiment 3

Figure 13:
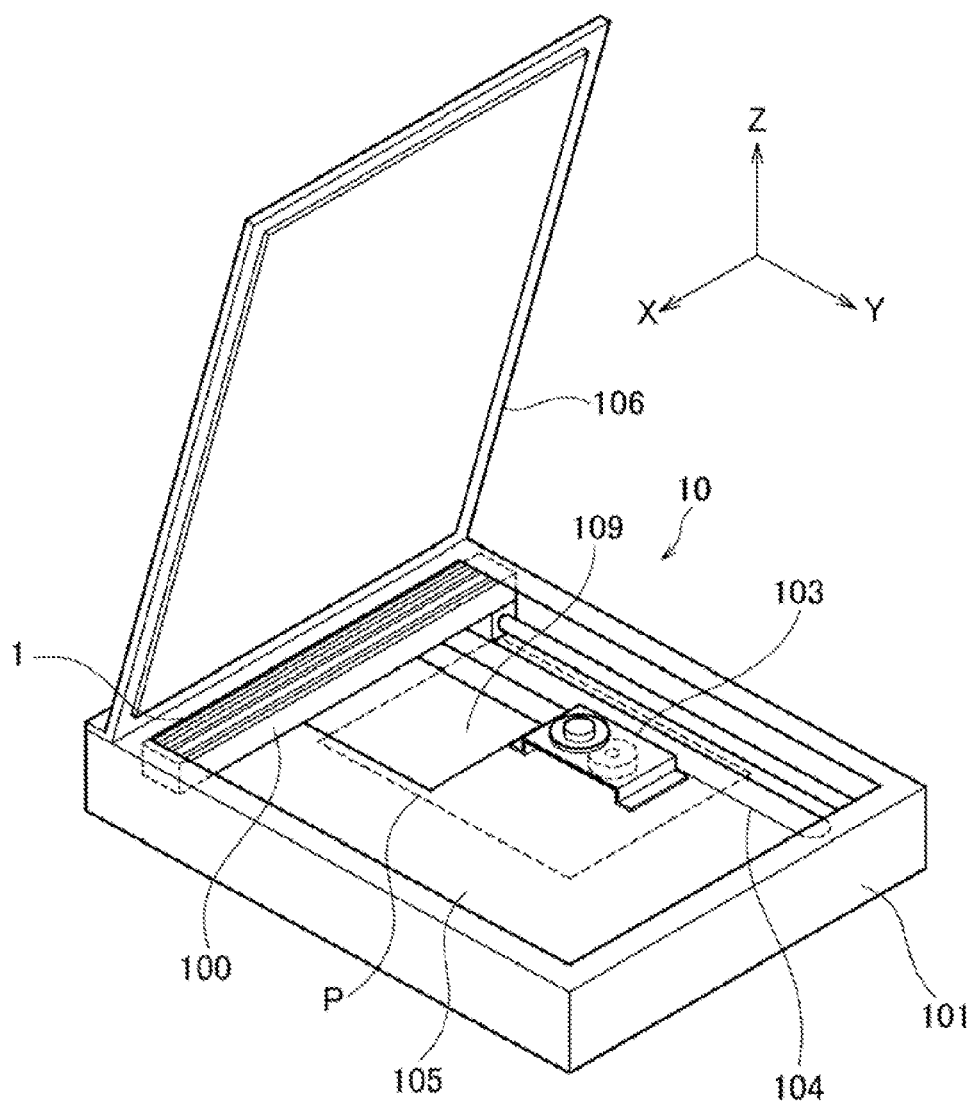
FIG. 13 is an external perspective view schematically showing an image reader according to an embodiment of the present invention.

Next, an image reader 10 according to the embodiment of the present invention will be described with reference to FIG. 13. The image reader 10 according to the embodiment of the present invention employs the image sensor unit 1 according to Embodiment 1 or 2. FIG. 13 is an external perspective view of the image reader 10 according to the embodiment of the present invention. As shown in FIG. 13, the image reader 10 according to the embodiment of the present invention is a flatbed scanner, in which the image sensor unit 1 according to Embodiment 1 or 2 is incorporated. The image reader 10 according to the embodiment of the present invention includes a cabinet 102, a unit stage 100 and a unit stage driving mechanism. The unit stage 100 is a component on which the image sensor unit 1 according to Embodiment 1 or 2 can be mounted. The unit stage driving mechanism is for moving the unit stage 100 on which the image sensor unit 1 is mounted according to Embodiment 1 or 2 in the sub-scanning direction. For instance, the unit stage driving mechanism includes a drive motor 103, a wire 104 that transmits the power of the drive motor 103 to the unit stage 100, and a guide shaft 107 that guides the unit stage 100. The configurations of the unit stage 100 and the unit stage driving mechanism are not particularly limited. A conventionally known configuration can be adopted. A sheet holder 105 is provided on the upper surface of the cabinet 102. The sheet holder 105 may be a transparent glass plate. Furthermore, a pressing plate 106 is provided at the end of the cabinet 102 in the sub-scanning direction by a hinge or the like in a manner allowing opening and closing. The pressing plate 106 has a function of pressing the sheet P placed on the upper surface of the sheet holder 105.

An operation and a usage method of the image reader 10 according to the embodiment of the present invention are as follows. The sheet P is placed facing down on the upper surface of the sheet holder 105, and the pressing plate 106 is closed. The drive motor 103 is driven to move the wire 104, thereby moving the image sensor unit 1 according to Embodiment 1 or 2 in the sub-scanning direction. At this time, the unit stage 100 is guided by the guide shaft 107. Accordingly, the image sensor unit 1 according to Embodiment 1 or 2 relatively moves in the sub-scanning direction with respect to the sheet P. An image of the sheet P is read for each reading line S, while the image sensor unit 1 according to Embodiment 1 or 2 is moved. The image read by the image sensor unit 1 is subjected to image processing at a signal processor 109 as necessary, and subsequently stored as image data. Thus, reading of the sheet P is completed.

The image reader 10 according to the embodiment of the present invention employs the image sensor unit 1 according to Embodiment 1 or 2, which can facilitate reduction in size, weight and cost. In particular, this can facilitate reduction in size and weight of mechanisms (e.g., the unit stage 100 and the unit stage driving mechanism) for driving the image sensor unit 1 according to Embodiment 1 or 2.

Note that, in the image reader 10 according to the embodiment of the present invention, the configuration of a conventionally known image reader can be adopted as parts on which the description is omitted.

Embodiment 4

Figure 14:
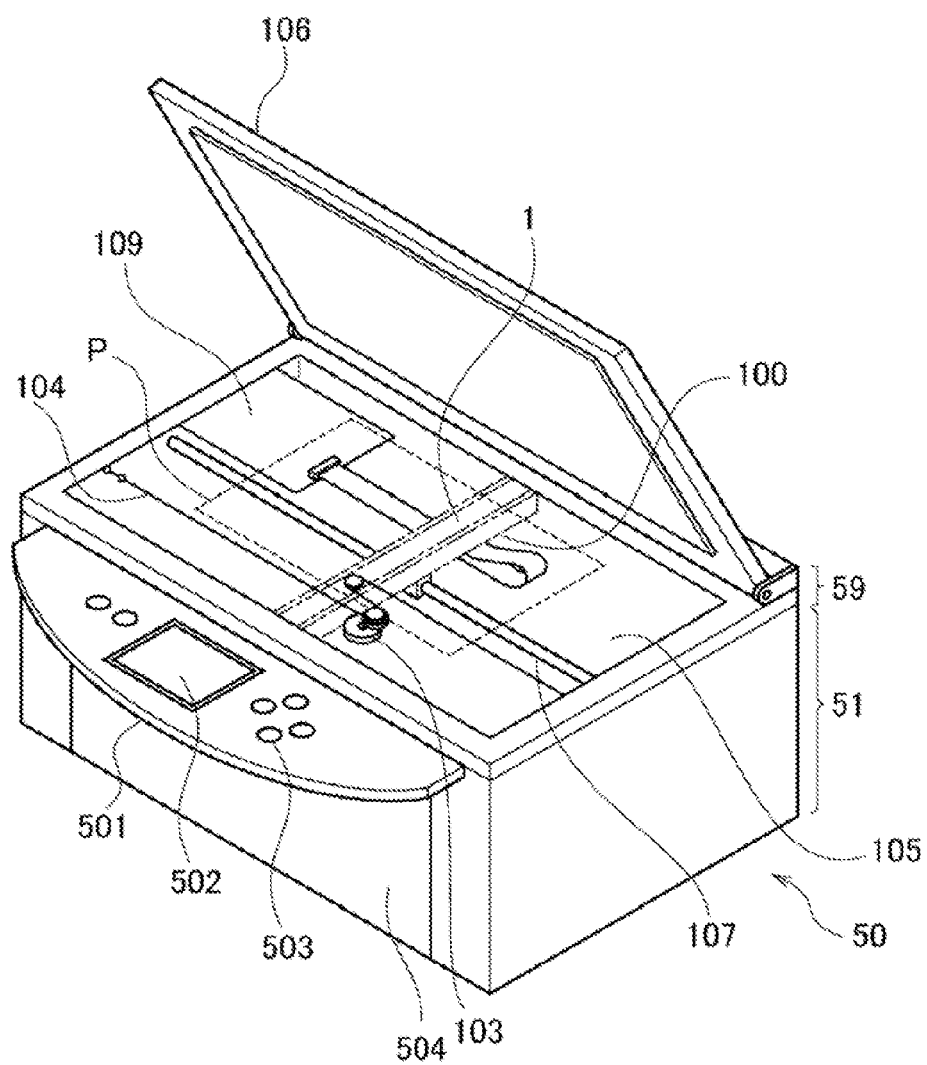
FIG. 14 an external perspective view of an image forming apparatus according to an embodiment of the present invention.
Figure 15:
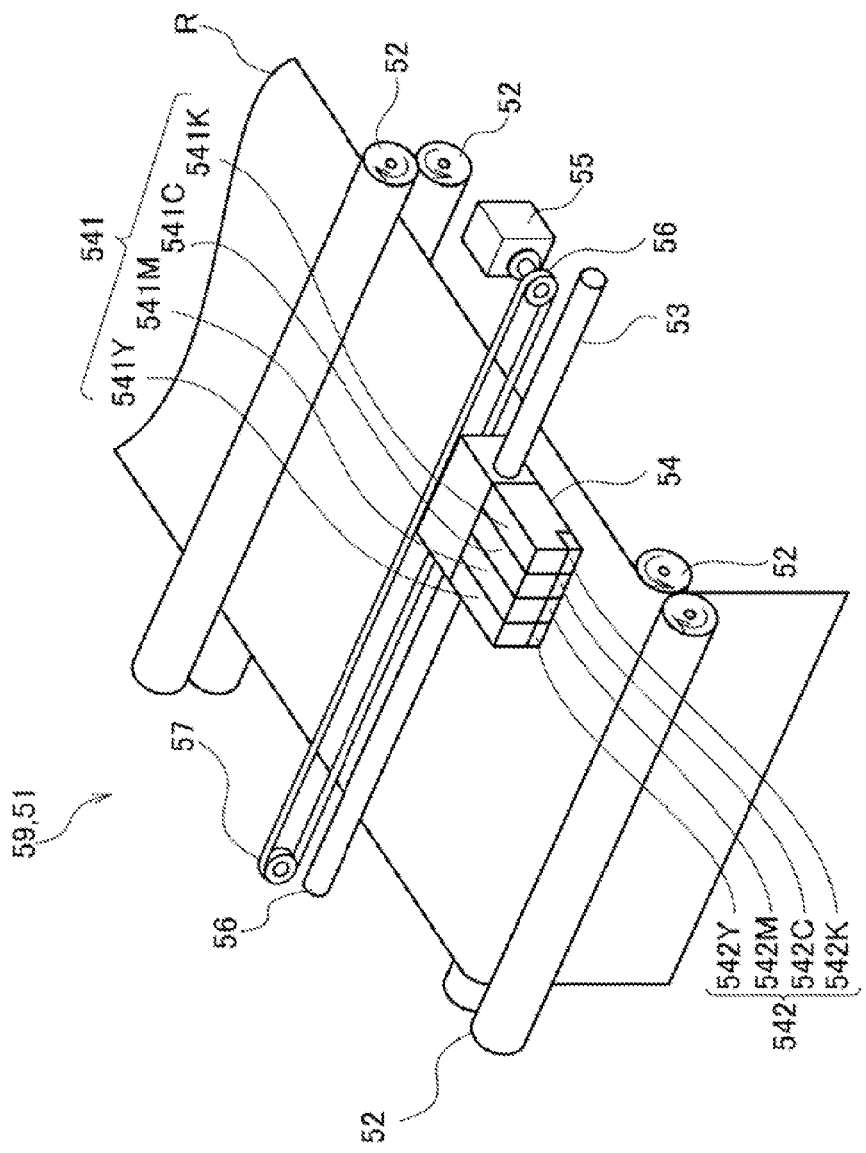
FIG. 15 is a perspective view schematically showing a configuration of an image forming unit of an image forming apparatus according to an embodiment of the present invention.

Next, an image forming apparatus 50 according to the embodiment of the present invention will be described with reference to FIGS. 14 and 15. The image forming apparatus 50 according to the embodiment of the present invention employs the image sensor unit 1 according to Embodiment 1 or 2. FIG. 14 is an external perspective view of the image forming apparatus 50 according to the embodiment of the present invention. FIG. 15 is an excerpt perspective view of the configuration of an image forming unit 51 provided in the cabinet of the image forming apparatus 50 according to the embodiment of the present invention. As shown in FIGS. 14 and 15, the image forming apparatus 50 is a multifunction printer integrating a flatbed scanner and an ink-jet printer, and includes an image reading unit 59 that reads an image, and an image forming unit 51 that forms an image. The image reading unit 59 of the image forming apparatus 50 incorporates the image sensor unit 1 according to Embodiment 1 or 2. The image reading unit 59 of the image forming apparatus can employ the configuration common to the image reader 10. Accordingly, the configurational components identical to those of the image reader 10 are assigned with the identical symbols. The description thereof is omitted.

As shown in FIG. 14, the image forming apparatus is provided with an operation unit 501. The operation unit 501 includes a display 502 that displays an operation menu and various messages, and various operation buttons 503 for operation of the image forming apparatus 50.

As shown in FIG. 15, the image forming unit 51 is provided in the cabinet 504 of the image forming apparatus 50. The image forming unit 51 includes a conveyor roller 52, a guide shaft 53, an ink-jet cartridge 54, a motor 55 and a pair of timing pulleys 56. The conveyor roller 52 rotates by a driving force of a driving source, and conveys a printing sheet R, as a recording medium, in the sub-scanning direction. The guide shaft 53 is substantially rod-shaped, and fixed to the cabinet of the image forming apparatus 50 such that the axis thereof is parallel to the main scanning direction on the printing sheet R. The ink-jet cartridge 54 can move to and fro in the main scanning direction on the printing sheet R by sliding on the guide shaft 53. The ink-jet cartridge 54 includes, for instance, ink tanks 541 (541C, 541M, 541Y and 541K) equipped with cyan C, magenta M, yellow Y and black K inks, and discharge heads 542 (542C, 542M, 542Y and 542K) provided at the respective ink tanks 541. One of the pair of timing pulleys 56 is attached to a rotating shaft of the motor 55. The pair of timing pulleys 56 are provided at positions separated from each other in the main scanning direction on the printing sheet R. The timing belt 57 is wound around the pair of timing pulleys 56 in a manner of open belt-drive. A prescribed position is connected to the ink-jet cartridge 54.

The image reading unit 59 of the image forming apparatus 50 converts the image read by the image sensor unit 1 into an electric signal. The image forming unit 51 of the image forming apparatus 50 drives the conveyor roller 52, the motor 55 and the ink-jet cartridge 54 on the basis of the electric signal converted by the image sensor unit 1 of the image reading unit 59, and forms an image on the printing sheet R. Furthermore, the image forming unit 51 of the image forming apparatus 50 is capable of forming an image on the basis of an electric signal input from the outside. Configurations same as those of conventionally known various printers can be adopted as the configuration and operation of the image forming unit 51 among the elements of the image forming apparatus 50. Accordingly, the detailed description thereof is omitted.

The image forming apparatus 50 according to the embodiment of the present invention adopts the image sensor unit 1 according to Embodiment 1 or 2 as the image reading unit 59. This can facilitate reduction in size, weight and cost. More specifically, this can facilitate reduction in size and weight of the mechanism for driving the image sensor unit 1 according to Embodiment 1 or 2 (e.g., the unit stage and the unit stage driving mechanism).

The embodiments of the present invention have been described in detail. However, the embodiments only describe specific examples for implementing the present invention. The technical scope of the present invention is not limited to the embodiments. The present invention can be variously modified in the scope without departing the gist thereof.

For instance, the image reader according to the present invention is not limited to the image scanner described in the embodiment. The image forming apparatus is not limited to the ink-jet system. Instead, the apparatus may be any system, such as an electronic photography system, a thermal transfer system or a dot-impact system, and is not limited to the multifunction printer described in the embodiment. Copiers and facsimile machines that employ the image sensor unit according to the present invention are classified as the image reader of the present invention.

Embodiments 1 and 2 have described the configuration employing the surface-mounted LED as the light source 6. However, the configuration of the light source 6 is not limited to such a configuration. That is, it is suffice that the light source 6 has a configuration that can be mounted on the circuit board 5 and, in the state of being mounted on the circuit board 5, can emit light in the direction (upward direction) perpendicular to the surface of the circuit board 5. Accordingly, for instance, an organic EL and a laser light source may be adopted as the light source 6. Furthermore, Embodiments 1 and 2 have described the configuration in which the light source 6 is provided at the one end of the light guide 3 in the longitudinal direction. The present invention is applicable to a configuration in which the opposite ends of the light guide 3 in the longitudinal direction are provided with the respective light sources 6.

The illuminating device, which includes the light source 6 and the light guide 3, is used as the light source for reflection at the sheet P. However, this device may be used as a light source for transmission therethrough.

The present invention can be effectively used as the image sensor unit, and an image reader and an image forming apparatus that employ this image sensor unit (e.g., an image scanner, facsimile machine, copier, multifunction printer, etc.).

According to the present invention, a typical, inexpensive surface-mounted light source is employed, and the light source is brought close to the image sensor. This allows reduction in size, in the sub-scanning direction, of the circuit board on which the light source and the image sensor are mounted. This facilitates reduction in size, weight and cost of the circuit board on which the light source and the image sensor are mounted. The reduction can in turn reduce the size, weight and cost of the image sensor unit. Furthermore, the present invention can facilitate reduction in size, weight and cost of the image sensor unit. This can in turn facilitate reduction in size, weight and cost of the image reader and the image forming apparatus that employs this unit.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image sensor unit for reading an illuminated object, the image sensor unit comprising:

a light source including a light-emitting surface that emits light;

a light guide including a substantially rod-shaped light emitter extending along a main scanning direction, the light guide guiding the light emitted from the light source to the illuminated object;

a contact image sensor that receives light from the illuminated object and converts the light into an electric signal;

a light condenser that focuses the light reflected from the illuminated object onto the contact image sensor;

a circuit board extending along the main scanning direction, the light source and the contact image sensor being mounted to the circuit board; and a frame that accommodates the light guide, the light condenser, and the circuit board, wherein the light guide extends along the main scanning direction parallel to the contact image sensor, and wherein the light guide is positioned off-set in a direction along a sub scanning direction, which is perpendicular to the main scanning direction, from the light-emitting surface of the light source, so that a center line, extending parallel with the contact image sensor, of the light-emitting surface of the light source is closer to the contact image sensor than a center line, extending parallel with the contact image sensor, of the light emitter of the light guide.

2. The image sensor unit according to claim 1, wherein the light source is a surface-mounted LED.

3. The image sensor unit according to claim 1, wherein one of end faces of the circuit board that is closer to the light guide is closer to an optical axis of the light condenser than an outline of the light emitter of the light guide that is farther from the light condenser is.

4. The image sensor unit according to claim 1, wherein the light guide includes a bent portion formed so as to be connected to one end of the light emitter in a longitudinal direction and bent toward the light-emitting surface of the light source, and an outer surface disposed at an outer portion with respect to a bending direction of the bent portion is formed into a continuously curved surface.

5. The image sensor unit according to claim 4, wherein a contour of a section of the bent portion taken along a sub-scanning direction is formed of a continuous curve.

6. An image reader for reading an illuminated object, the image reader comprising:

an image sensor unit comprising:

a light source including a light-emitting surface that emits light;

a light guide including a substantially rod-shaped light emitter extending along a main scanning direction, the light guide guiding the light emitted from the light source to the illuminated object;

a contact image sensor that receives light from the illuminated object and converts the light into an electric signal;

a light condenser that focuses the light reflected from the illuminated object onto the contact image sensor;

a circuit board extending along the main scanning direction, the light source and the contact image sensor being mounted to the circuit board; and a frame that accommodates the light guide, the light condenser, and the circuit board, wherein the light guide extends along the main scanning direction parallel to the contact image sensor, wherein the light guide is positioned off-set in a direction along a sub scanning direction, which is perpendicular to the main scanning direction, from the light-emitting surface of the light source, so that a center line, extending parallel with the contact image sensor, of the light-emitting surface of the light source is closer to the contact image sensor than a center line, extending parallel with the contact image sensor, of the light emitter of the light guide, and wherein the image reader reads an image of the illuminated object, while relatively moving the contact image sensor unit and the illuminated object.

7. An image forming apparatus comprising:

an image forming unit that forms an image on a recording medium; and an image reader for reading an illuminated object, wherein the image reader includes an image sensor unit comprising:

a light source including a light-emitting surface that emits light;

a light guide including a substantially rod-shaped light emitter extending along a main scanning direction, the light guide guiding the light emitted from the light source to the illuminated object;

a contact image sensor that receives light from the illuminated object and converts the light into an electric signal;

a light condenser that focuses the light reflected from the illuminated object onto the contact image sensor;

a circuit board extending along the main scanning direction, the light source and the contact image sensor being mounted to the circuit board; and a frame that accommodates the light guide, the light condenser, and the circuit board, wherein the light guide extends along the main scanning direction parallel to the contact image sensor, wherein the light guide is positioned off-set in a direction along a sub scanning direction, which is perpendicular to the main scanning direction, from the light-emitting surface of the light source, so that a center line, extending parallel with the contact image sensor, of the light-emitting surface of the light source is closer to the contact image sensor than a center line, extending parallel with the contact image sensor, of the light emitter of the light guide, and wherein the image reader reads an image of the illuminated object, while relatively moving the contact image sensor unit and the illuminated object.

* * * * *